Dec. 7, 1937.   K. RAUCH   2,101,452
RECORDING SCALE
Filed Sept. 26, 1933   6 Sheets-Sheet 1

FIG.1.

INVENTOR
Konrad Rauch
BY
ATTORNEY

Dec. 7, 1937.  K. RAUCH  2,101,452
RECORDING SCALE
Filed Sept. 26, 1933   6 Sheets-Sheet 3

INVENTOR
Konrad Rauch
BY
W. M. Wilson
ATTORNEY

FIG.4a.

Dec. 7, 1937.  K. RAUCH  2,101,452

RECORDING SCALE

Filed Sept. 26, 1933   6 Sheets-Sheet 6

INVENTOR
Konrad Rauch
BY
W. M. Wilson
ATTORNEY

Patented Dec. 7, 1937

2,101,452

UNITED STATES PATENT OFFICE 2,101,452

RECORDING SCALE

Konrad Rauch, Dayton, Ohio, assignor to International Business Machines Corporation, New York, N. Y., a corporation of New York Application September 26, 1933, Serial No. 690,985

15 Claims. (Cl. 234—5.4)

This case relates to combination weighing and recording machines and is an improvement on Patent No. 1,914,388.

The object of the invention, in general, is to provide a novel intercontrol between recording and weighing mechanisms.

Further, the object is to provide a novel intercontrol which will depend for its operation on the equilibrium condition of the scale before becoming effective to select the recording means for action.

Still further, the object is to provide an intercontrol which will nullify a partially completed recording selection if the equilibrium of the scale is disturbed before recording is effected and cause a new recording selection when the scale subsequently reaches equilibrium.

Another object is to provide a novel scale controlled motor drive for an auxiliary mechanism.

The latter object is further to provide a one-revolution shaft drive for controlling the selection by the scale of auxiliary means.

Still another object is to provide an electrical hook-up from the scale to a graph recorder.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 7 is a perspective view of an adding machine and the scale controlled solenoids for operating the keyboard, and Fig. 8 is a section along line 8—8 of Fig. 4a.

The invention is herein illustrated and described in connection with a five hundred pound scale of the pendulum dial type shown in Patent No. 1,870,233, although it will be understood that the principles of the invention are applicable to other similar scales.

Load sensing and analyzing section

Figure 1:
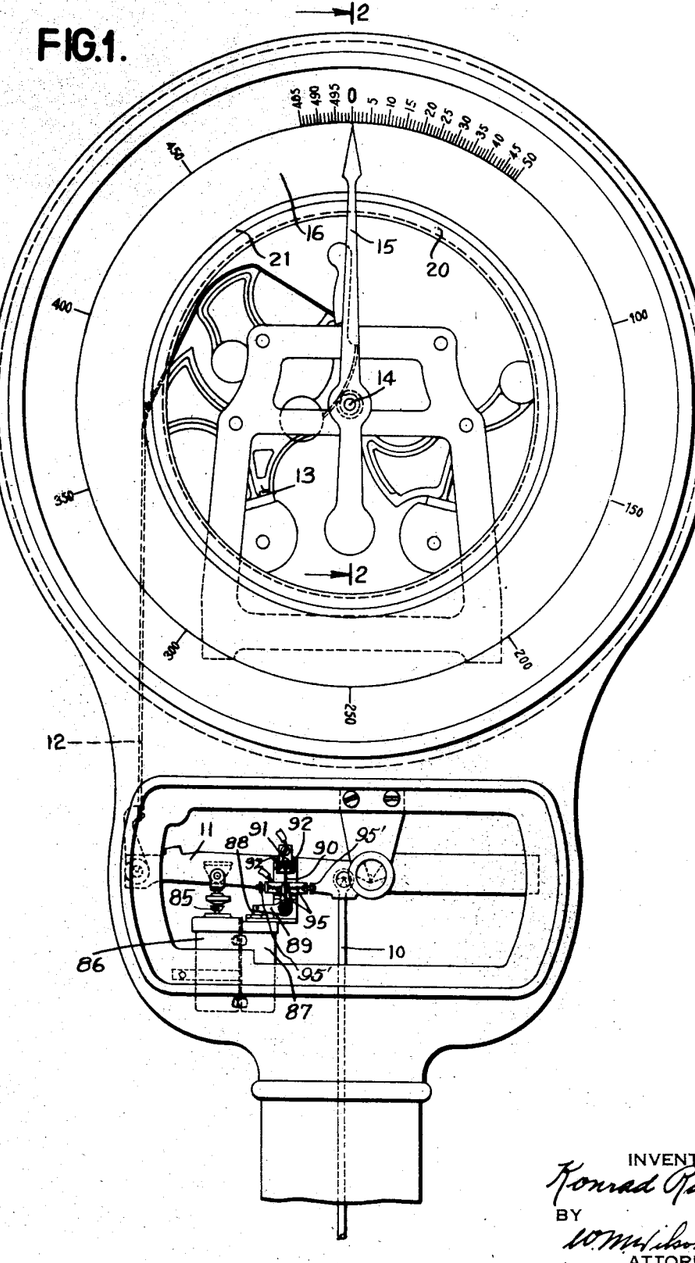
Fig. 1 is a front view of the scale.

Referring to Fig. 1, the illustrated scale comprises a draft rod 10 for transferring the load of the base levers and platform (not shown) to an intermediate lever 11 which is connected through tape 12 to the pendulum system 13 and the indicator shaft 14. Pointer 15 on shaft 14 traverses the graduated ring dial or annulus 16 to visually indicate the weight.

To the pointer is secured by bracket 17 (see Fig. 2) an insulating plate 18 and a conducting strip 19, the upper end of which travels in a path closely adjacent the inner edge of a ring 20 of conductive material. Both dial 16 and ring 20 are concentric and held flat against the face of a circular insulating plate 21 within which is set a series of five hundred radial bars 22, spaced apart a distance corresponding to a pound swing of the pointer 15 and terminating at their inner end at the same distance from the strip 19 as the inner circumference of ring 20. Strip 19 is of such width as to extend in transverse overlapping relation to the inner edges of the radial bars 22 and the inner edge of ring 20.

Figure 2:
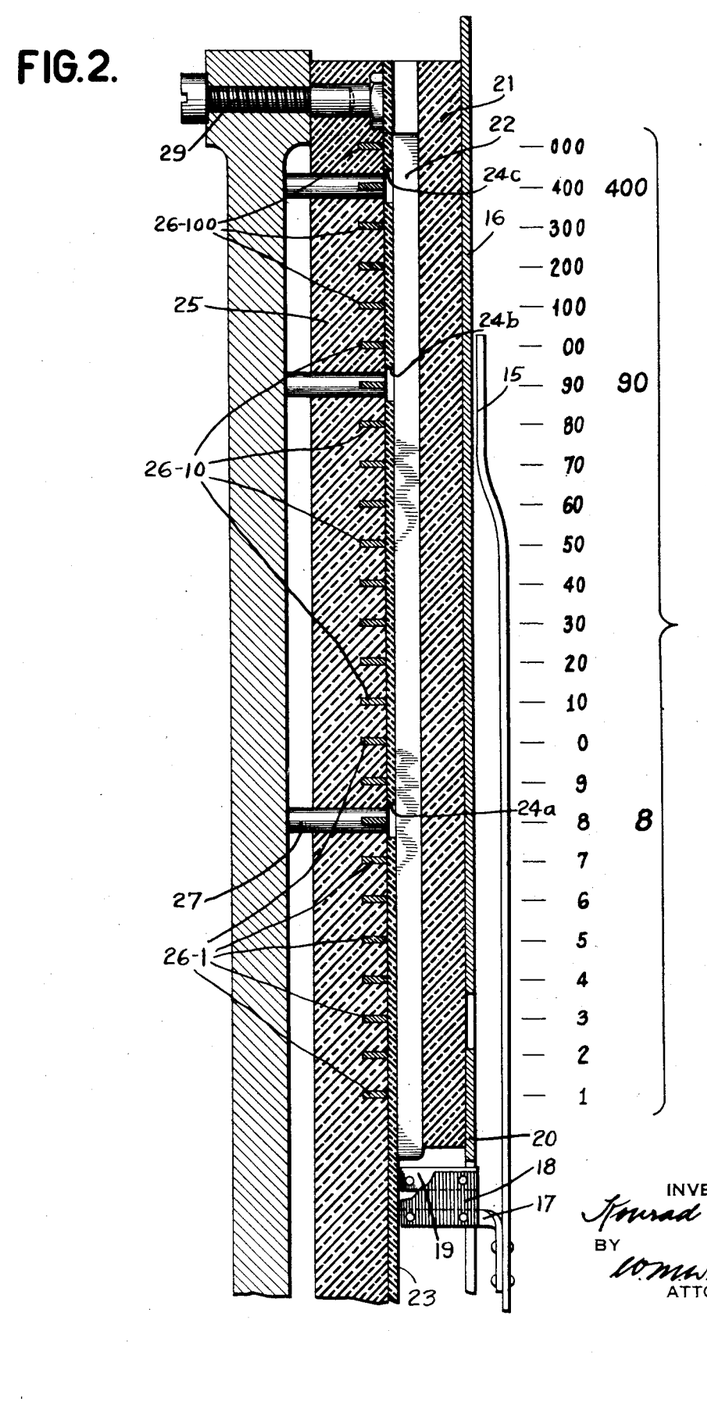
Fig. 2 is a section through the weight analyzing part of the scale.

Behind bars 22 is an insulator plate 23 of mica or the like having perforations 24 arranged in accordance with the dial indications. Engaging the back of plate 23 is a plate 25 of insulating material in which are set twenty-five concentric circular conductive bands or hoops 26.

Hereinafter, wherever elements of the same kind relate to different denominational orders, they will be distinguished by the number of the denominational order appended to the common reference character. Thus the ten inner bands 26 are in the units order and may be characterized at 26—1, the next ten bands are in the tens order and may be characterized as 26—10, and the outer five bands are in the hundreds order and may be characterized as 26—100.

To each band 26 is fixed a terminal plug 27 (see Fig. 2) from which wire 28 leads to the high tension relays 44 (Fig. 4) to be hereinafter described. The assembly of dial 16, annulus 20, plate 21 with bars 22, mica plate 23, and plate 25 with bands 26 is secured to the scale frame by bolts 29. The cooperating parts 15, 19, 20, 21, 22, 23, 25, and 26 may be hereinafter alternatively termed the analyzer, selector, or control means or section of the scale.

Figure 3:
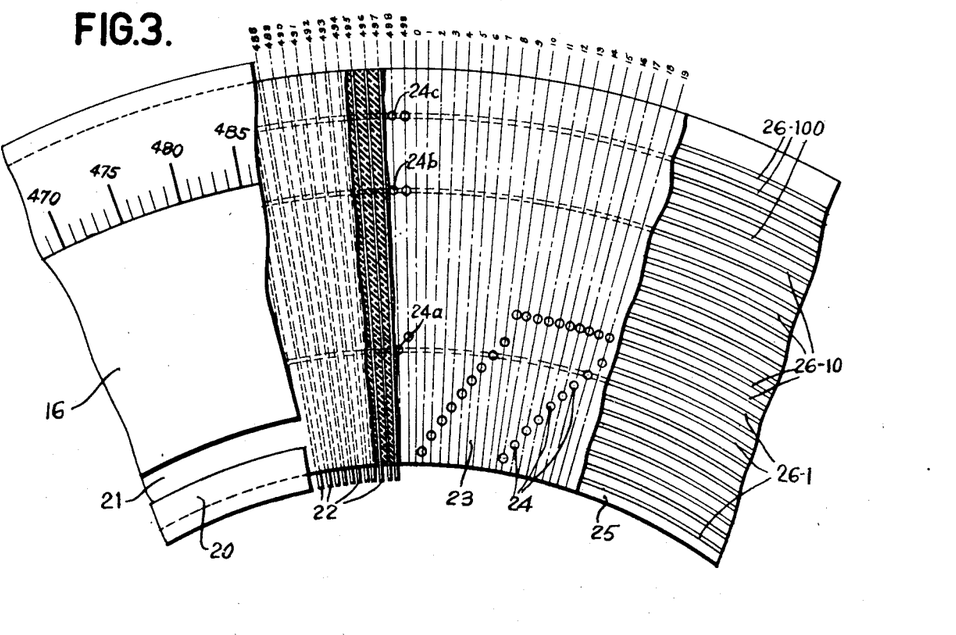
Fig. 3 is a front view of the analyzing part with successive layers removed to show the parts more clearly.

Perforations 24 in plate 23 combine with radial bars 22 to analyze the load into differential denominational order equivalents. Thus, in the example shown in Figs. 2 and 3, a 498 pound load is analyzed by the bar 22 at the 498 pound point and the following perforations 24 covered by this bar; perforation 24a directly in front of 8 pound band 26—1, perforation 24b in front of 90 pound band 26—10, and perforation 24c in front of 400 pound band 26—100. At the proper time, the translation of the load is effected through high tension or jump spark selection circuits which cause sparks to jump from common ring 20 to strip 19, from strip 19 to the bar 22 at the load point, and from this bar 22 through perforations 24a, b, and c to the 8, 90, and 400 pound bands 26. The term "load translating means" is used in its ordinary sense of converting or translating load forces into equivalent electrical and mechanical manifestations. This load translating means includes the high tension circuits B, traced hereinafter, and the elements of said circuits including the analyzer.

Figure 4:
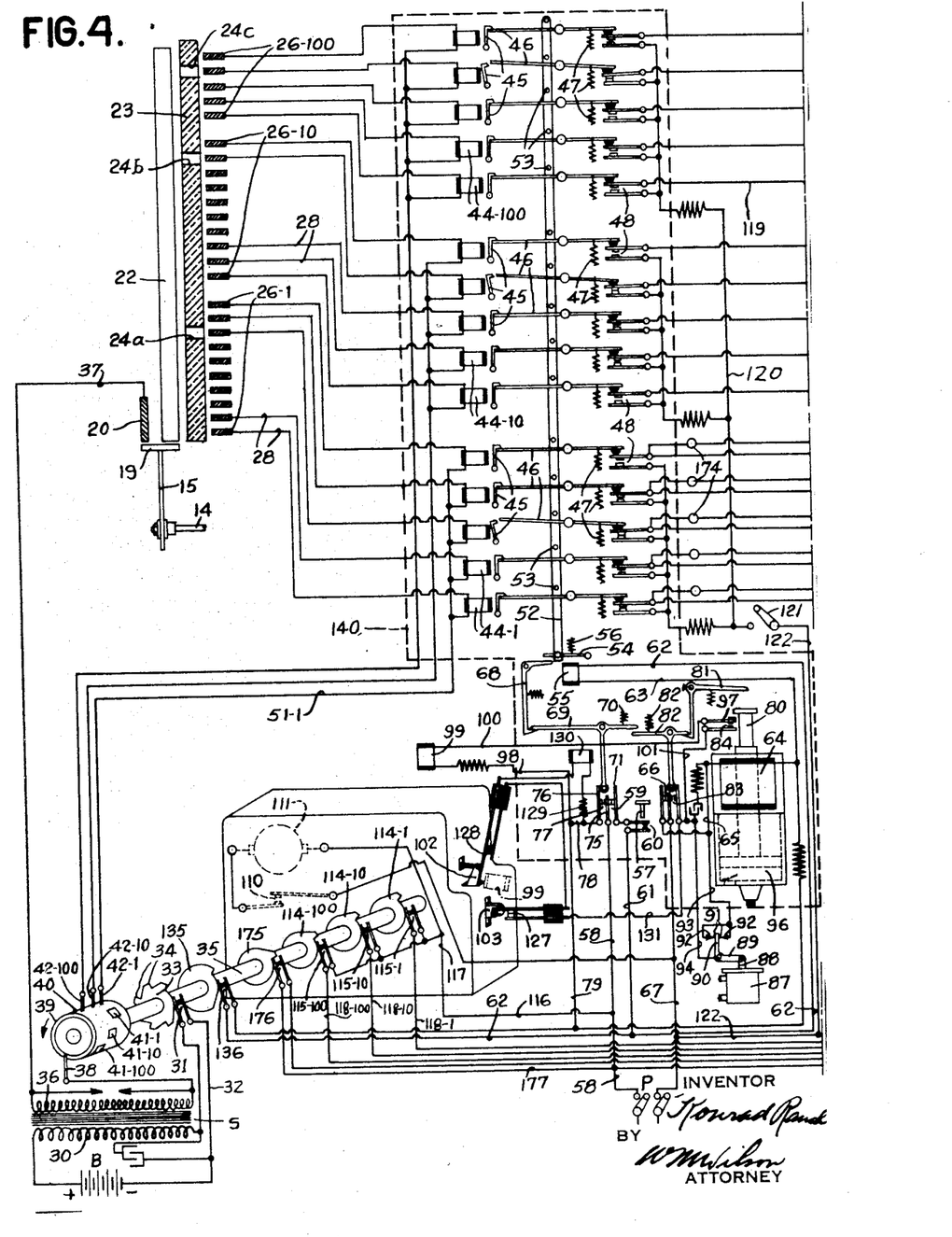
Figs. 4 and 4a combined show a diagram of the circuit and the mechanism controlled thereby.

The means by which these selection circuits are formed will now be described with reference to Figs. 4 and 4a.

High tension selection circuits

The jump spark selection circuits derive their energy from an ignition or spark coil S. The circuit of the primary 30 of the ignition coil is as follows:

*Circuit A.*—From the + side of battery B, through primary 30, contacts 31 (when closed), and through line 32 to the — side of battery B.

Figure 6:
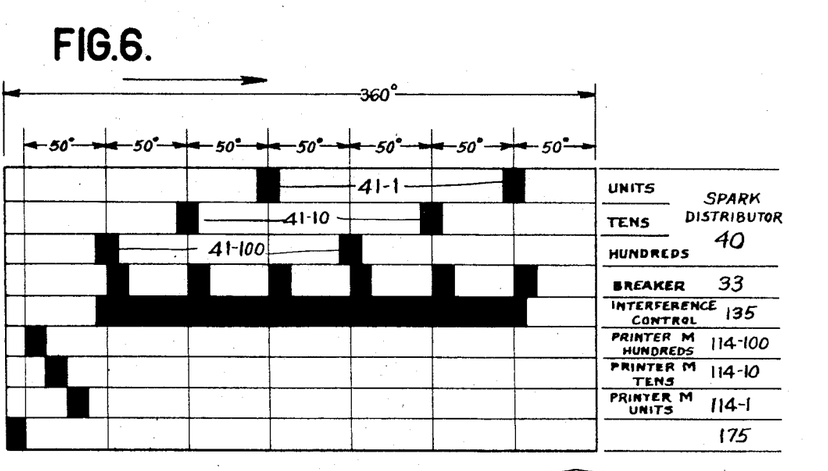
Fig. 6 is a timing chart of the operations.

Contacts 31 are opened and closed by a breaker cam 33 having six teeth 34. The cam 33 is mounted on a one-revolution cam shaft 35. In one revolution of cam 33, teeth 34 will make and break contacts 31 six times. Each make and break of the contacts closes circuit A through primary 30, inducing a high potential in the secondary 36 of the ignition coil. One side of the secondary is connected by line 37 to the common conductive ring 20 of the analyzer section of the scale. The other side of the secondary is connected to a feeler 38 wiping a common return ring 39 on a distributor 40 mounted on shaft 35. Spaced about the distributor are two each of conductive spots 41—1, 41—10, and 41—100, coacting with alined feelers or brushes 42—1, 42—10, and 42—100. Referring to Fig. 6, it will be seen that the order in which feelers 42—1, 42—10, and 42—100 respectively engage spots 41—1, 41—10, and 41—100 in one cycle are units, tens, hundreds, units, tens, and hundreds. The making and breaking of contacts 31 in the primary circuit is so timed as to cause a high potential to be built up in the secondary 36 of ignition coil at the time the brushes 42 are contacting their spots 41. Jump spark circuits will then be completed through brushes 42, spots 41 engaged thereby, through the analyzer section of the scale, and through high tension relays 44—1, 44—10, and 44—100. Relays 44 when energized unlatch their respective armatures 45 from levers 46 which are then depressed by springs 47 to close contacts 48 in the low tension circuits for selecting printing control solenoids 49—1, 49—10, and 49—100.

To illustrate the manner in which the high tension selecting circuits are formed to select and close contacts 48, the previous example of a 498 pound load on the scale will be taken. Assuming shaft 35 to be moving, the teeth 34 of cam 35 will make and break contacts 31 in the primary circuit of the ignition coil to induce a high potential in the secondary 36 of the ignition coil at the time that brush 42—1 in contacting either of its distributor spots 41—1. The following jump spark circuit will then be formed:

*Circuit B.*—From one side of the secondary 36, through wire 37 to ring 20. From ring 20, a spark bridges the gap to strip 19 and another spark jumps from strip 19 to the bar 22 at the 498 pound position. From this bar 22, the circuit is bridged by emission of a spark from the bar through perforation 24a to the 8 pound band 26—1. The circuit continues from 8 pound band 26—1 through the connected wire 28 to one side of the high tension relay 44—1 in series therewith, and from this relay through common unit return line 51—1 to the units brush 42—1, through the spot 41—1 contacting this brush, and through distributor ring 39 and feeler 38 to the other side of the secondary 36. The relay 44—1 in series with the 8 pound band 26—1, when energized by the circuit just described, attracts its armature 45 to unlatch coacting lever 46 which is then operated by its spring 47 to close the associated contacts 48 in the low tension circuit of the printing control solenoid 49—1 corresponding to 8 in the units denomination.

In a similar manner, when tens brush 42—10 is engaging either of spots 41—10, a jump spark circuit is completed to close the contacts 48 in series with the printing control solenoid 49—10 corresponding to 9 in the tens bank, and when hundreds brush 42—100 engages either of spots 41—100, a circuit is completed to close the contacts 48 in series with the magnet 49—100 corresponding to 4 in the hundreds bank.

The order in which the jump spark circuits are formed is the same as that in which the brushes 42 engage the distributor bands 41, that is, units, tens, hundreds, units, tens, and hundreds. By successively forming the circuits in one denomination after another, the full energy of the ignition coil is taken advantage of for one circuit instead of being distributed over three circuits. A lower voltage may then be used without sacrificing the strength of the sparks necessary to assume the bridging of the circuit at the gaps. By making the circuit of each denomination twice during one cycle, the possibility of failure of the circuits to be completely formed is reduced to a minimum.

Start and reset operations

At the beginning of the operations, some of levers 46 may accidentally have become unlatched by jarring of armatures 45 which may be due to the scale being shifted or the load being abruptly applied to or removed from the platform. Accordingly, some of the contacts 48 may be undesirably closed. To obviate this, the cycle begins with relatching all the levers 46 which may have become unlatched.

The means for relatching levers 46 comprises a rectilinearly movable bar 52 having a pin 53 above each lever. To the lower end of bar 52 is pivoted the armature 54 of a resetting magnet 55. Energization of magnet 55 rocks its armature 54 against resistance of spring 56 to lower bar 52 and cause the pins 53 to rock all levers 46 into latching engagement with armatures 45 of the high tension relays 44. Resetting magnet 55 is energized by the following circuit when the operator presses on start key 57 to initiate the cycle of operations:

*Circuit C.*—From the + side of a D. C. power source P through line 58, normally closed contacts 59, start key contacts 60, leads 61 and 62, resetting magnet 55, lead 63, solenoid coil 64, line 66, normally closed contacts 66, and through wire 67 to the — side of the power source.

Magnet 55 being energized rocks the free end of armature 54 down against resistance of spring 56 and causes pins 53 to return the levers 46 to relatched positions. In order that levers 46 may subsequently be freely released by armatures 45 when relays 44 are energized, reset bar 52 must be raised to release pins 53 from the levers. To effect this, magnet 55 is deenergized after resetting has taken place, even though start key 57 may still be held down and start key contacts 60 closed. Deenergization of reset magnet 55 is effected as follows: After the armature 54 has lowered bar 52 sufficiently to cause pins 53 to relatch the levers 46, the free end of the armature engages and rocks a latch pawl 68 to unlatch a T-lever 69 which is then rocked counterclockwise by a spring 70 (as viewed in Fig. 4). Lever 69 thereupon engages spring blade 71 bearing one of previously referred to contacts 59 and disengages this contact from the coacting one on blade 75.

At the same time, lever 69 is followed in its movement by a spring blade 76 bearing one of contacts 77, the other of which is on one side of blade 75, until contacts 77 engage. Opening of contacts 59 breaks circuit C, deenergizing reset magnet 55 and permitting spring 56 to restore armature 54 and bar 52 to initial, raised position. Lever 69 is maintained by spring 70 in position to hold contacts 59 open and contacts 77 closed. Accordingly, circuit C cannot be re-established, to again energize magnet 55, by continued or repeated depressions of the start key, until the next cycle of weighing and recording operations takes place.

Circuit C also energized solenoid 64 which thereupon raised its core 80 to release a pair of contacts 84 which controls the motor operation through circuit F as later explained. If the core 80 has been lifted to its upper limit in which it strikes latch lever 81, then closing of contacts 77 causes a circuit E to be established under equilibrium control of the scale. If, however, solenoid 64 has not been energized by circuit C long enough to raise core 80 to its upper limit, then the following circuit D through solenoid 64 is established by closing of contacts 77:

*Circuit D.*—From + side of source P through line 58, contacts 77, connecting wires 78 and 79, solenoid 64, line 65, contacts 66, and line 67 to the — side of the source P.

Energization of solenoid 64 by circuit D moves core 80 to the upper limit. Contacts 84 therefore remain open. The upper end of the core strikes latch lever 81 to release it from a T-lever 82, which is then rocked clockwise by spring 82' to open contacts 66 (in circuit D) and permit contacts 83 to close. Contacts 83 when closed permit establishment of equilibrium sensing circuit E, to be later described, for preventing printing selection while the scale parts are in motion and before the scale pointer has stopped moving or oscillating as will be explained under the next heading.

*Initial equilibrium control*

It is necessary to prevent a wrong selection of the printing control solenoids 49 that the scale parts be in equilibrium and the pointer 15 at rest before selection begins. For this purpose, an equilibrium sensing control is provided which blocks printing selection until the pointer has come to rest and stopped oscillating. To understand the operation of the equilibrium control, assume a load has been placed on the scale, the start key 57 has been depressed, and the levers 46 have been relatched. At this time, contacts 77 have been closed under control of lever 69 when circuit C was established, and contacts 83 have been closed under control of lever 82 when circuit D was established.

The load on the platform of the scale lowers draft rod 10 to rock lever 11 which then operates the pendulum system and sets the pointer 15 moving to seek a position corresponding to the load. Connected in the usual way to beam 11 is the plunger 85 (see Fig. 1) of a dash pot 86 which dampens oscillation of the scale parts.

Connected to dash pot 86 is an auxiliary, by-pass dash pot 87 of smaller cross-section in which is movable a light plunger 88, vibration of which is set up by the movement of the plunger in the main dash pot. The vibration of plunger 88 is transmitted to a bell lever 89 carrying a vertical spring strip 90 provided with two oppositely disposed contacts 91, alternately engageable with stationary contacts 92 one at each side of the strip.

Engagement of contacts 91 and 92 completes a blocking circuit to prevent printing selection. This circuit is as follows:

*Circuit E.*—From the + side of source P, through line 58, contacts 77 (now closed), lines 78, 79, solenoid 64, line 93, contacts 91, 92, line 94, contacts 83 (now closed), and through line 67 to the — side of source P.

Solenoid 64 which had been energized by circuit D is maintained energized by circuit E as long as the scale parts are in motion to cause vibration of spring strip 90. When the scale reaches equilibrium and the pointer comes to rest, the strip 90 will stop vibrating and contacts 91 and 92 will be held separated by a pair of springs 95. As shown in Fig. 1, springs 95 are disposed at opposite sides of spring strip 90, each spring being connected at one end to a screw 95' carried by stationary bracket 950 fixed to the top of dash pot 87 and at the opposite end to the vertical arm of bell crank 89. The pair of springs act in opposition to each other and are adjusted to normally hold the vertical arm of the bell crank lever in such position that contacts 91 on the upper end of spring strip 90 will be in neutral position, mid-way between, and out of engagement, with the contacts 92 which are secured to bracket 950. Energization of solenoid 64 by circuit E retains the plunger 80 in its uppermost position and therefore motor control contacts 84 remain open while the scale parts are in motion. When the scale parts reach equilibrium, contacts 91 and 92 break and circuit E is broken, deenergizing solenoid 64 which then permits core 80 to descend.

The descent of core 80 is retarded by an air dash pot 96 to delay closing of contacts 84 for a brief interval to make certain that contacts 91 and 92 have been separated by a true or steady condition of scale equilibrium. When core 80 finally descends, its head engages the upper leaf 97 carrying one of contacts 84 and thereby effects closing of these contacts.

With closing of contacts 84, the initial equilibrium control has completed its function and the printing selection now takes place. At this time, the load is on the platform, the pointer is at rest at the point of the graduated dial 16 indicating the amount of the load, the strip 19 on the pointer is radially in line with the radial bar 22 at the load point, and contacts 84, 83, and 77 are closed. The printing selection will now be explained.

Printing selection

With the closing of contacts 84, the following circuit is established:

Circuit F.—From the + terminal of source P, through line 58, contacts 77, line 78, line 98, magnet 99, line 100, contacts 84, line 101, contacts 83, and through line 67 to the − side of source P.

It will be noted that this circuit is formed through contacts 77 and 83 which are open prior to the resetting operation caused by depression of start key 57. After the resetting operation and under control of the core 80 of the equilibrium sensing device, contacts 77 and 83 are closed and therefore circuit F may be formed to initiate the selection of the contacts 48 which select solenoids 49 for determining the record to be printed.

Figure 5:
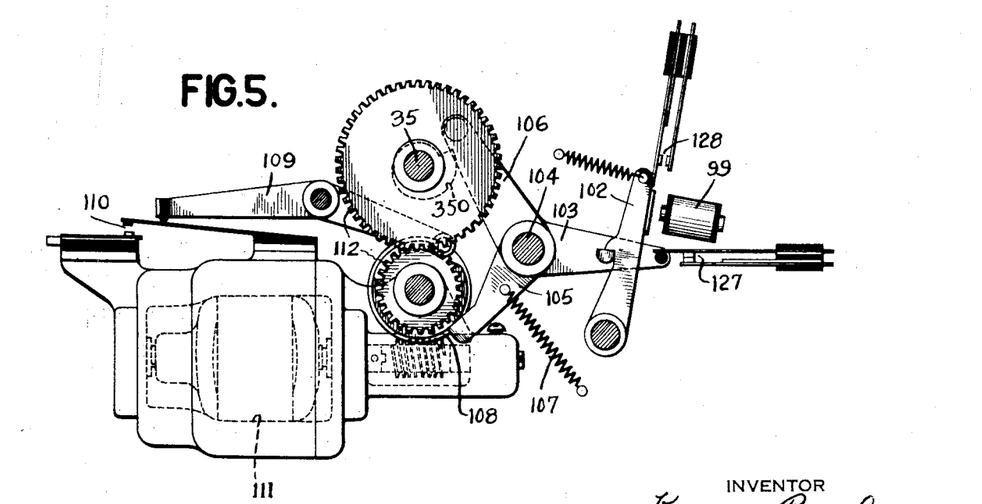
Fig. 5 is a view of the one-revolution clutch mechanism.

Magnet 99 controls a one-revolution motor drive, the mechanism of which may be as disclosed in Patent No. 1,144,418. In brief, the control of the drive by magnet 99 is effected as follows:

Circuit F energizes magnet 99 which attracts its lever armature member 102 (see Figs. 4 and 5) to release an arm 103 fast to shaft 104 to which are also fast arms 105 and 106. When arm 103 is released, a spring 107 rocks the shaft 104 counterclockwise. Arm 105 thereupon releases a clutch device 108 to permit it to rock a lever 109 which closes contacts 110. These contacts are in the motor circuit and when closed complete the motor circuit to set the motor 111 in operation. The motor shaft is connected through gearing 112 to the aforesaid cam shaft 35. When shaft 35 has made one revolution, a cam 350 thereon rocks arm 106 and thereby shaft 104 clockwise. Arm 105 on shaft 104 thereupon is returned to its initial position in which it engages the clutch device 108 to interrupt operation of the latter. In the home position of the clutch device, lever 109 is raised to permit contacts 110 to open and break the motor circuit.

For details of the clutch device 108, reference may be had to aforesaid Patent No. 1,144,418.

Shaft 35 being in motion, cam 33 and distributor 39 mounted thereon cause the formation of the jump spark circuits B to select the relays 44 of the several denominations in denominational order and cause selective closing of contacts 48, as explained under the heading high tension selection circuits.

The high tension selecting circuits occur while the cam 33 is making and breaking contacts 31 six times which is within the first 310 degrees of the revolution of shaft 35, as may be seen from the timing diagram (Fig. 6). At the end of this time, contacts 48 will have been selectively closed in accordance with the load.

During the remainder of the one revolution of shaft 35 cams 114—1, 114—10, and 114—100 on the cam shaft successively and in the order named, close their respective follower contacts 115—1, 115—10, and 115—100. When contacts 115—1 close, the following circuit is established:

Circuit G.—From the + side of the source P, through lines 116 and 117, contacts 115—1, line 118—1, through the printing control solenoid 49—1 in series with the closed contacts 48—1, through line 119, through said contacts 48—1, through line 120, hand switch 121, and line 122 to the − side of the power source.

In a similar manner, closing of contacts 115—10 and 115—100 establish selecting circuits through printing solenoids 49—10 and 49—100. The selected solenoids being energized will operate their cores 490 to depress the keys 123 of the units, tens, and hundreds banks of the adding machine 124, in a manner which may be as disclosed in Patent No. 1,446,963. Operation of the adding machine handle 125 will then cause the machine to print the amount of the load on the scale.

Restoring

At the end of one revolution of shaft 35, cam 350 thereon has acted on arm 106 to rock shaft 104 clockwise, as previously described. The free end of arm 103 on shaft 104 is thereby depressed to permit closing of a pair of spring blade contacts 127 (see Figs. 4 and 5). Magnet 99 is still energized by circuit F and therefore armature 102 is in attracted position, in which position it is holding a pair of spring blade contacts 128 closed. Contacts 127 and 128, when both closed, establish the following circuit for effecting restoration of parts:

Circuit H.—From the + side of the source P through line 58, contacts 77, now closed, resistance 129, restoring magnet 130, contacts 128, contacts 127, line 131, contacts 83 (now closed) and through return line 67 to the − side of the source.

Magnet 130 being energized by this circuit, attracts the stem of the T-lever 69, rocking the lever clockwise. The left end of the lever cams along the lower end of the latch 68 pushing the latter away until the lever snaps into latching engagement with the latch end. When lever 69 is rocked clockwise, its right hand end engages the left end of lever 82, rocking the latter counterclockwise to be relatched by latch pawl 81. Levers 69 and 82 are now in initial position and contacts 59 are closed, contacts 77 open, contacts 66 closed, and contacts 83 open. Contacts 77 and 83 both being in circuit F, the latter is now open and accordingly magnet 99 is deenergized. The parts are now in the same condition as when the entire series of operations began. A new cycle may now be initiated by pressing down start key 57. It will be understood that when circuit F is completed to energize magnet 99 for attracting latch 102, that spring 107 moves arm 103 to positively open contacts 127 prior to closure of contacts 128 by latch 102. Thus the restoring circuit is not formed upon the initial energization of magnet 99 by circuit F but is only formed after contacts 128 have been closed and contacts 127 are closed at the end of a complete cycle of the motor.

Brief summary

The cycle of operations just described is the normal cycle and may be briefly stated as follows: A load was placed on the scale, start key 57 was depressed, restoration of levers 46 took place, the scale equilibrium sensing device operated to control closing of contacts 84, the latter when closed caused operation of motor 111 to rotate cam shaft 35 for one revolution, the jump spark or high tension selection circuits were formed, contacts 48 closed thereby in accordance with the load, printing control solenoids 49 were then energized, and restoration of the parts to initial starting condition was then automatically effected.

Secondary or intermediate equilibrium control

While the above series of operations may be considered normal, it will take place only if the scale equilibrium is undisturbed during the period of selection of contacts 48 by the jump spark circuits B. The interval necessary for proper formation of the jump spark selection circuits corresponds to the time required for the six spark impulses to be formed under control of the cam 33. The required interval is about one second and during this period, in order that the correct selection take place, the scale equilibrium should not be disturbed. As locking of the scale to prevent the possibility of the scale equilibrium being disturbed is undesirable, means are provided to prevent effective selection of the contacts 48 in the event that the scale loses its equilibrium during the interval of about one second during which the six spark impulses occur. Should the scale equilibrium be disturbed during the period in which the six sparks are emitted and the corresponding period of selection by the scale analyzer of contacts 48, then the normal cycle of operations will not be completed but the selected contacts 48 will be reopened, the cam shaft 35 will be given a second revolution, and the selection cycle will be repeated. This is accomplished by the following means:

On shaft 35 is a cam 135 controlling contacts 136. Considering the cycle of operations as measured by a single revolution of shaft 35, it will be seen from the timing diagram (Fig. 6) that contacts 136 are closed during a portion of the cycle which begins with the first distributor spot 41—1 and ends with the last spot 41—100. Since these spots determine the selection interval, then the contacts 136 are closed during the entire selection interval.

If during this interval of about one second, the scale mechanism moves, then strip 90 is set vibrating to close contacts 91 and 92 which in conjunction with the closed contacts 136 completes the following circuit:

*Circuit I.*—From the + side of the power source P through line 58, contacts 77 (still closed at this time), leads 78, 79, contacts 136, line 62, resetting magnet 55, line 63, solenoid 64, contacts 91 and 92 (now rapidly engaging), contacts 83 (still closed) and through wire 67 to the — side of the source.

This circuit energizes resetting magnet 55 to cause resetting of all levers 46 and opening of contacts 48, as previously explained under the heading start and reset operations.

A disturbance of the scale equilibrium sets plunger 88 and the parts connected thereto in motion. This motion imparted to bell lever 89 carrying spring strip 90 is supplemented with respect to strip 90 by the independent vibration of the strip as its contacts 91 alternately strike the stationary contacts 92. By adjustment of the springs 95 and the actions of dash pots 86 and 87, the vibration of strip 90 when once begun can be made to endure for a minimum interval of about one second. Hence, if strip 90 has been set in vibration at any point after the selection interval began, which interval as previously stated, also occupies about one second, then the contacts 91 and 92 will be engaging during the remainder of the selection cycle.

Since contacts 136 also remain closed during this interval, circuit I will be maintained and magnet 55 remain energized till the end of the selection cycle. As magnet 55 remains energized, contacts 48 cannot be closed during the rest of the selection cycle. Accordingly, the action of the breaker cam 33 and the distributor 40 will be ineffective to close any of contacts 48 if during the selection cycle, the scale equilibrium was disturbed.

Circuit I also energizes solenoid 64 to raise core 80 and reopen contacts 84. After contacts 136 open to break circuit I, the solenoid 64 remains energized provided the scale is still out of equilibrium, by the previously described circuit E. If equilibrium is reestablished during the short remainder of the cycle which is left after contacts 136 open, then solenoid 64 is deenergized and core 80 starts to drop. The dash pot 96 retards descent of core 80 so that before the head of the core can strike blade 97 and close contacts 84, the shaft 35 has completed its revolution.

Contacts 84 having been opened, circuit F through magnet 99 will be broken, and armature 102 will be released by the magnet thus permitting contacts 128 to open. Accordingly, when the motor and clutch control member 103 drops near the end of a revolution of shaft 35 to close contacts 127, circuit H through restoring magnet 130 cannot be established because contacts 128 are now open. Therefore, T-levers 69 and 82 will not be restored to initial positions, and contacts 77 and 83 will remain closed even though one revolution of shaft 35 and motor 111 has been completed and the clutch 108 re-latched by arm 105.

Now when the scale reaches equilibrium once more, contacts 84 will be closed by core 80, circuit F through magnet 99 will be established, armature 102 will again be attracted to unlatch member 103 and contacts 110 will reengage to cause operation of the motor and clutch control for driving the cam shaft 35 for another revolution. The breaker cam 33 on the cam shaft will again cause emission of six sparks, and the high tension selection circuits will be established to cause a new selection of contacts 48 correctly corresponding to the scale reading. During this repeat cycle, should equilibrium of the scale again be disturbed, the interference control will again operate to cause a third revolution of cam shaft 35. Thus, every time equilibrium of the scale is disturbed during the selection cycle, cam shaft 35 will repeat its cycle.

*Hook-up to graphic recorder*

Figure 4A:
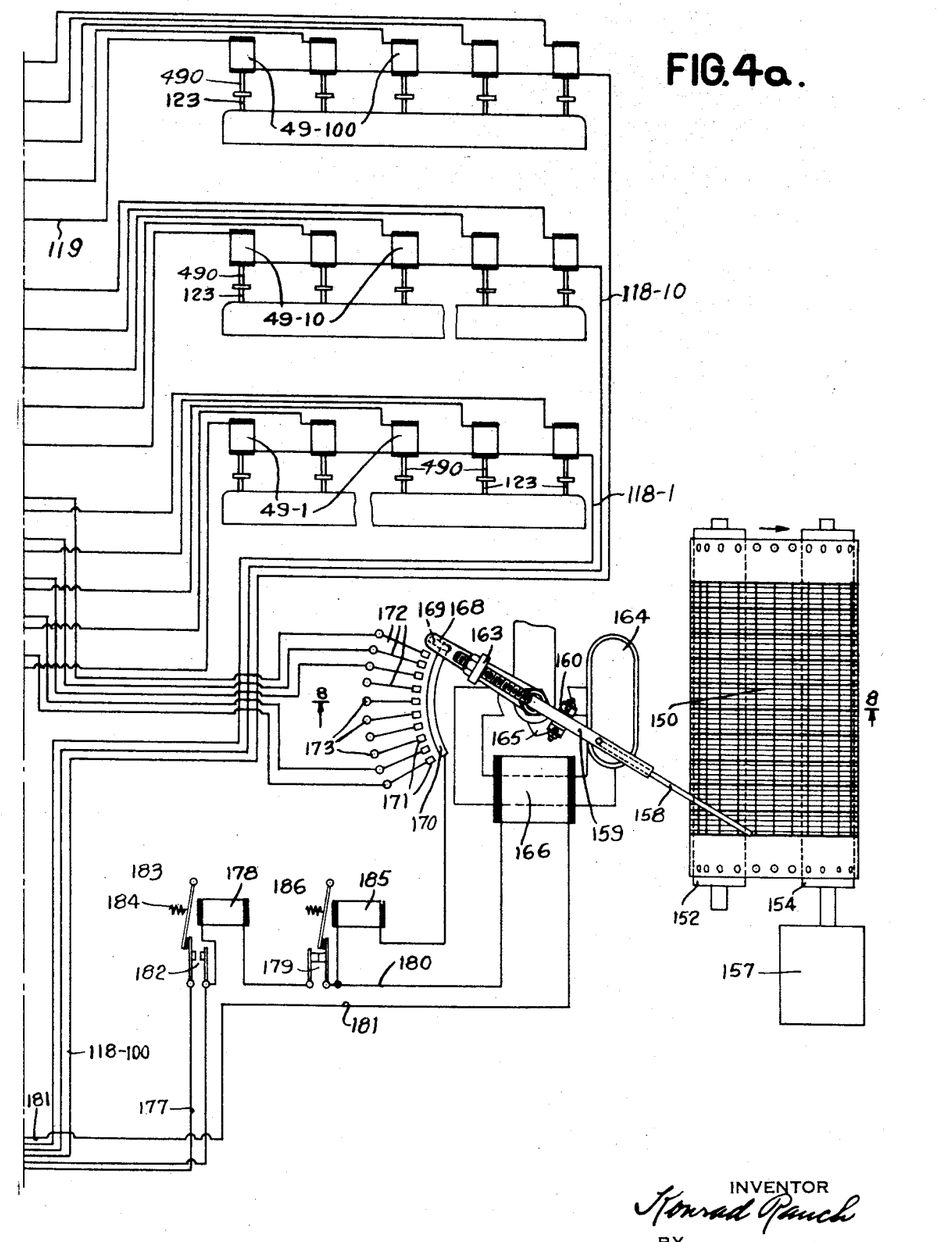
Figures 7, 8:
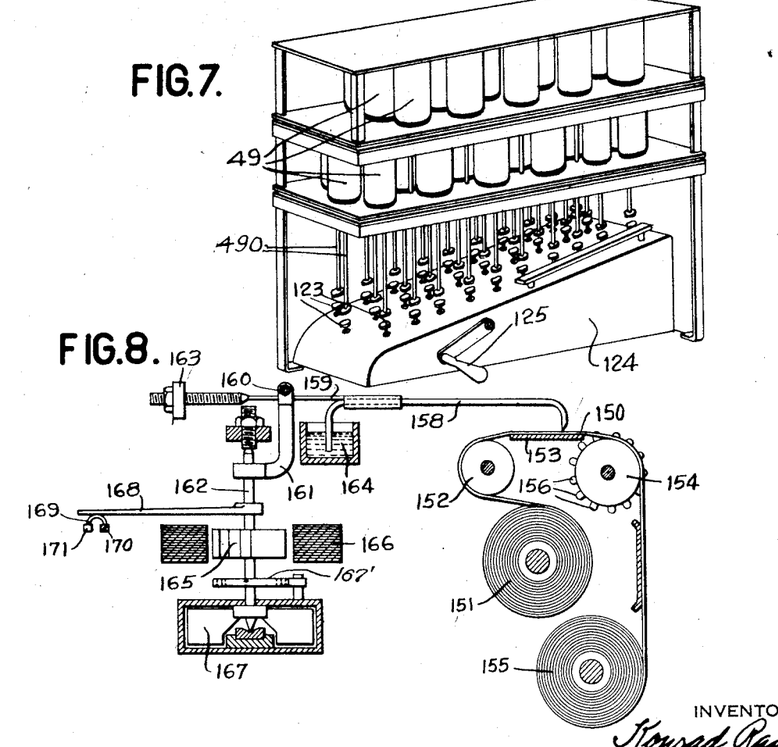

Figs. 4a and 8 show a graphic recorder and the manner in which it is electrically plugged into the selection portion of the combined scale and recording mechanism. One purpose of a graphic recorder is to indicate the variation of different loads over a given time interval from a desired average or standard load. Another purpose is to determine the production efficiency of the scale whereby the number of weighings in a certain period and the idle periods of the scale may be known. For these uses, the graph sheet may be fed by a clock mechanism. A graphic recorder may also be used to provide a permanent record on a single sheet of the total weight of material weighed during a given period. In the latter case the graph sheet may be fed once for each weighing operation or alternatively by a clock mechanism.

Usually a graphic recorder is used where the loads on the scale are of a desired average or standard weight to show the under and over departure of each load from the standard. For instance, if an article has an average or standard weight of 255 pounds, the graph sheet will have ten graduations starting at 250 pounds and going up to 260 pounds. The indications on this sheet would then show how much the load is above or below the average weight of 255 pounds.

The graphic recorder comprises a web 150 passing from a supply roll 151 over an idler roller 152, across a flat plate 153, over a feeding roller 154, and to the storage roll 155. The edges of the web 150 are perforated to receive driving teeth 156 of the feeding roller 154 which is driven by a clock mechanism 157 of any suitable type. The stylus 158 is fastened to an arm 159 pivoted for vertical movement at 160 to a hub 161 fast to a vertical shaft 162. Counterweights 163 on the outer end of arm 159 are adjusted to maintain the writing end of stylus 158 in proper contact with the part of web 150 lying on plate 153. The rear end of stylus 158 is bent downwardly into an inkwell 164 to draw ink from the latter. A damping device 167 is provided to prevent overthrow of the stylus when it is rotated. To rotate the stylus, shaft 162 carries the armature 165 of a magnet 166 which when energized rotates the shaft from home position in one direction against the resistance of a clock spring 167'. When the magnet 166 is deenergized, the spring 167' returns armature 165 to home position.

Magnet 166 is controlled as follows: To shaft 162 of the stylus is fixed an arm 168 carrying a bridging contact 169 which connects conductive segment 170 to ten contact studs 171 each having a plug connection 172 to plug sockets 173 on the switchboard. These sockets are each wired to a corresponding one of the terminals 174 of the units order of contacts 48 which are in circuit with the key operating solenoids 49—I.

When the cam shaft 35 has been set in motion for a selection cycle, as hereinbefore explained, relays 44 are selectively energized to cause closing of contacts 48. Thereafter, a cam 175 on the cam shaft causes follower contacts 176 to close for an instant to complete the following circuit:

*Circuit K.*—From + line 58, through line 177, contacts 176, magnet 178, normally closed contacts 179, line 180, magnet 166, line 181, and line 122, to − line 67.

Magnet 166 being energized, it causes counterclockwise rotation of the armature 165 and similar movement of the stylus shaft 162. Circuit K is maintained by contacts 176 for only an instant. Thereafter a holding circuit K is formed by closing of contacts 182 which shunt contacts 176. Contacts 182 are closed by magnet 178 which is energized by circuit K to attract its armature 183 which moves against resistance of spring 184 to close contacts 182.

The armature 165 has now been set moving to actuate the stylus and advance feeler 170 along the contact segment 170 and the contact studs 171. When feeler 169 engages a stud 171 which is in series with a closed pair of contacts 48, the following circuit is formed to stop movement of the stylus:

*Circuit L.*—From + line 58, through line 177, contacts 182, magnet 178, contacts 179, magnet 185, contact segment 170, the stud 171 then engaged by the feeler 169, its connection 172, plug socket 173, and terminal 174 of the closed contacts 48 in the units order, through these contacts 48, switch 121, and through line 122 to the − line 67.

Circuit L energizes magnet 185 which attracts its armature 186 to open contacts 179, thereby breaking the holding circuit K' and circuit L. Magnet 166 is now deenergized and the armature 165 is returned to home position by spring 167.

*Final summary*

A load is placed in the scale and pointer 15 actuated towards the load point of dial 16 indicating the load. The operator depresses start key 57 to close circuit C which energizes reset magnet 55 and solenoid 64. Energization of magnet 55 causes relatching of levers 46 to open all contacts 48 and movement of T-lever 69 to open contacts 59 and close contacts 77. The opening of contacts 59 breaks circuit C to deenergize reset magnet 55 and release levers 46 for selective unlatching by relays 44. Solenoid 64 is now fully energized by closing of contacts 77 to form circuit D. Solenoid 64 then raises core 80 to its upper limit. When core 80 rises, it permits motor control contacts 84 to open. However, contacts 84 even if closed are ineffective to cause motor operation unless contacts 83 are closed. This is effected when core 80 at its upper limit strikes latch 81 to release T-lever 82 which thereupon opens contacts 66 in circuit D and closes contacts 83.

Opening of contacts 66 breaks circuit D and places further energization of the solenoid under control of equilibrium condition of the scale. If the scale is at rest, then the core 80 descends to close contacts 84 and cause motor operation. If the scale is not at rest, then circuit E which is the equilibrium control or blocking circuit E holds solenoid 64 energized to maintain core 80 raised and contacts 84 open until equilibrium is established. When this occurs, contacts 91 and 92 controlled by auxiliary dash pot 87 separate and circuit E breaks, deenergizing solenoid 64 to permit descent of core 80 which then closes contacts 84. The closing of contacts 84 establishes circuit F to energize magnet 99 and cause the motor and clutch control contacts 110 to make.

The motor 111 thereupon operates the cam shaft 35 for one revolution. High tension or jump spark selection circuits B are then formed successively in units, tens, and hundreds denominations to selectively energize relays 44 which unlatch corresponding levers 46 to close the contacts 48 in circuit with the printing control solenoids 49 of the units, tens, and hundreds orders. After the selection cycle, cams 114 successively close their contacts 115 to form circuits G which include the closed contacts 48 and the connected solenoids 49. The latter thereupon operate their cores 490 to depress the keys 123 of the adding machine 124 which may then be operated by handle 125 (or by motor if desired) to furnish a printed record of the load.

After cam 114—100 closes contacts 115—100 cam 175 on shaft 35 momentarily closes contacts 176 to form circuit K which energizes magnet 166 for actuating the stylus pen 158 of the graph recorder. The magnet is held energized by a holding circuit K' until the stylus has moved a distance proportional to the load in the units order when contact plate 169 engages the contact stud 171 corresponding to the contacts 48 which have been closed in the units order and forms circuit L. Circuit L opens circuit K' to deenergize magnet 166 and the stylus is then returned to home position by spring 167.

Should the scale equilibrium be disturbed during the period in which the high tension selection circuits B are being formed, the equilibrium sensing contacts 91, 92 make and contacts 136 being now closed by cam 135 on shaft 35, circuit I is established to energize reset magnet 55 for relatching all levers 46 and reopening all contacts 48. Magnet 55 causes contacts 48 to stay open until after the selection cycle. Thereafter, contacts 136 open and magnet 55 is deenergized, freeing contacts 48 for selecting closure by levers 46. Circuit I also energizes solenoid 64 which is kept energized by shunt circuit E after circuit I breaks when contacts 136 open, so long as equilibrium sensing contacts 91—92 are making and breaking.

When the scale again reaches equilibrium, the circuit J opens to deenergize solenoid 64, the core 80 then descending to close contacts 84. This closes circuit F to operate cam shaft 35 for another revolution. The selection cycle then repeats, and this time, if equilibrium is not disturbed, selection of printing solenoids 49 occurs and the record of the load is printed. The restoring circuit H is then completed and the parts restored in preparation for the next cycle of operations.

The high tension relays 44, levers 46, contacts 48, reset magnet 55, reset bar 52, the solenoid 64, contacts 84, levers 68, 69, 81, 82, contacts 59, 77, 66, 83, start key 57, start key contacts 60, printer switch 120, restoring magnet 130, and magnets 178 and 185 are all mounted on switchboard 140.

While the invention has been disclosed in connection with the illustrated forms, it is understood that the principles of the invention cover all variations, changes, and departures from the illustrated forms which lie within the scope of the mechanical skill. It is desired to be limited, therefore, only in accordance with the appended claims.

In the claims, shaft 35 may be referred to as a motor-driven device, mechanism, or means or as an actuator or a drive. Magnet 166 (Fig. 4a) may be referred to as actuating means.

I claim:—

1. In a weighing scale in which load weighing mechanism and exhibiting mechanism are provided; circuits for determining operation of the exhibiting mechanism and including switches biased to closed condition, latches for holding the switches open, magnets for controlling said latches, means for simultaneously and commonly resetting the switches into cooperation with the latches to initially place all said switches in open condition, circuits for energizing said magnets to operate said latches for selectively releasing said switches for movement into closed condition, means controlled by the weighing mechanism for selecting said second-mentioned circuits for operation according to the load and means for preventing operation of the second-mentioned circuits before the switches have first been reset, and rendered ineffective in response to operation of the resetting means as the latter commonly resets the switches.

2. In a weighing scale in which load weighing mechanism is provided, the combination of a selectively operable device, means for selectively operating said device in accordance with a load acting on the weighing mechanism, a primary equilibrium control for said means for preventing operation of the latter until the weighing mechanism reaches equilibrium, and a secondary equilibrium control for said means for nullifying the selection by said means upon a disturbance of the equilibrium of the weighing mechanism after selection by said means has begun.

3. In a machine wherein load weighing mechanism is provided; an actuator, selectively operable mechanism, elements for determining operation of the latter mechanism, means having a cycle of operations for selectively operating the elements in accordance with a load on the weighing mechanism, means operated by the actuator for effecting the cycle of the first-mentioned means, and means responsive to a disturbance of equilibrium of the weighing mechanism during said cycle for nullifying the selective operation of said elements by said first-mentioned means.

4. In a machine wherein load weighing mechanism is provided; an actuator, selectively operable mechanism, elements for determining operation of the latter mechanism, means having a cycle of operations for selectively operating the elements in accordance with a load on the weighing mechanism, means operated by the actuator for effecting the cycle of the first-mentioned means, a primary equilibrium control for initiating operation of the latter means by said actuator upon the scale reaching equilibrium, a secondary equilibrium control, means controlled by the latter for nullifying operation of the elements by said first-mentioned means upon the weighing mechanism equilibrium being disturbed during said cycle, and means controlled by the secondary equilibrium control for automatically causing the first-mentioned means to repeat their cycle for again selectively operating the elements.

5. In a machine wherein load weighing mechanism is provided; a one-revolution actuator, load manifesting mechanism, selectively operated elements for determining operation of the latter mechanism, means for selectively operating said elements in accordance with a load on the weighing mechanism, means responsive to operation of said actuator for causing the first-named means to operate a device operated by a disturbance of equilibrium of the weighing mechanism, and means operated by said device upon disturbance of the weighing mechanism equilibrium during selective operation of said elements for restoring the latter to unoperated condition.

6. In a machine wherein weighing mechanism is provided; a one-revolution motor drive, selectively operable mechanism, elements for determining operation of the latter mechanism, load translating means for selectively operating said elements in accordance with the load, means responsive to operation of said drive for causing operation of the load translating means, means controlled by a disturbance of equilibrium of the weighing mechanism during operation of said first-named means for rendering operation of said elements by the translating means ineffective, and means controlled by restoration of equilibrium for causing the motor drive to make a second revolution for repeating operation of said first named means to re-select said elements for operation.

7. In a machine in which load weighing mechanism is provided; the combination of a recorder, a motor drive, controlling means operated in accordance with a load on the weighing mechanism for controlling differential operation of the recorder, means operated by the motor drive through one cycle of the latter for rendering the controlling means effective to control operation of the recorder in accordance with the load, a device for sensing the equilibrium of the scale, means controlled by the device for automatically starting operation of the motor when the weighing mechanism reaches equilibrium, a control normally operative to limit the motor drive to a single cycle, and means controlled by the equilibrium sensing device for rendering said control ineffective upon disturbance of the equilibrium of the weighing mechanism during a cycle.

8. In a machine in which load weighing mechanism is provided; the combination of a recorder including a differentially movable device, an automatic actuating means for automatically moving said device, jump spark means for analyzing the operation of the weighing mechanism, and circuits controlled by the jump spark analyzing means for governing differential movement of the aforesaid recorder device by said actuating means in proportion to the magnitude of the analyzed load.

9. In a machine wherein load weighing mechanism is provided; the combination of a graphic recorder including a differentially movable stylus, a magnetic motor for moving said stylus, a circuit for energizing said motor, a device for breaking said circuit to stop operation of the stylus thereby, and means jointly controlled by the weighing mechanism and the stylus for rendering said device effective to break said circuit upon the stylus reaching a point corresponding to the load.

10. In a machine wherein load weighing mechanism is provided; the combination of a graphic recorder including a stylus and a magnetic motor for operating the stylus, a circuit for said magnetic motor including a normally closed switch, a magnet, means controlled by the magnet for opening said latter switch, a circuit for said magnet, differentially arranged contact points, a feeler operated by the stylus for successively engaging said points and placing them in said magnet circuit, and means controlled by the weighing mechanism for selectively completing the magnet circuit through one of said contact points and the feeler to thereby energize said magnet for causing said normally closed switch to open.

11. In a machine wherein load weighing mechanism is provided; the combination of a graphic recorder including a differentially movable stylus, an electrical actuator for moving the stylus, a circuit for energizing said actuator, a switch in said circuit, a magnet, means controlled thereby for opening said switch to deenergize said actuator, differentially disposed contact points, a feeler movable with the stylus for successively engaging said contact points, switches each serially connected with one of said contact points, means controlled by the weighing mechanism for selectively closing said switches, and a circuit completed through the closed one of said latter switches and the corresponding contact point upon the feeler engaging the latter for energizing said magnet to open said first-mentioned switch and break the actuator circuit to thereby stop operation of the stylus by the actuator.

12. In a machine including load weighing mechanism; the combination of a drive, load manifesting mechanism, selectively operable elements for determining operation of the load manifesting mechanism, resetting means for preliminarily resetting said elements to unoperated condition, load translating means to selectively operate said elements according to a load on the weighing mechanism, means responsive to operation of said drive for causing said translating means to operate, and means controlled by the resetting means for initiating operation of the drive only after the elements have been reset.

13. In a machine including load weighing mechanism; the combination of a drive, load manifesting mechanism, elements for determining operation of the load manifesting mechanism, load translating means, having a cycle of operation to selectively operate said elements in accordance with a load setting of the weighing mechanism, apparatus operated by the drive for causing the cycle of operation of the load translating means, resetting means to preliminarily reset the elements, and means controlled by the resetting means to initiate the operation of the apparatus by said drive.

14. In a machine including load weighing mechanism; the combination of a plurality of switches biased to closed condition, circuits containing said switches, exhibiting mechanism controlled by said circuits, resetting means to commonly open all of said switches, load translating means for selectively reclosing said switches in accordance with the load on the weighing mechanism, cyclically operating mechanism, means controlled by operation of the resetting means when commonly opening said switches for initiating a cycle of operation of the cyclically operating mechanism, and means controlled by the latter mechanism during the cycle thereof for rendering the translating means effective.

15. In a machine wherein load weighing mechanism is provided, the combination of a plurality of switches, means urging these switches to close, circuits containing the switches, exhibiting mechanism controlled for operation by said circuits, resetting means having a resetting operation for commonly opening all the switches, load translating means to reclose the switches according to a load, means for causing the load translating means to operate, and a device for preventing operation of the translating means, prior to the resetting operation, and rendered ineffective by a part of the resetting means as the latter effects common opening of the switches.

KONRAD RAUCH.